R. DELANEY.
ROPE AND TWINE MAKING MACHINE.
APPLICATION FILED MAY 9, 1905.
1,031,695.
Patented July 9, 1912.
2 SHEETS—SHEET 1.
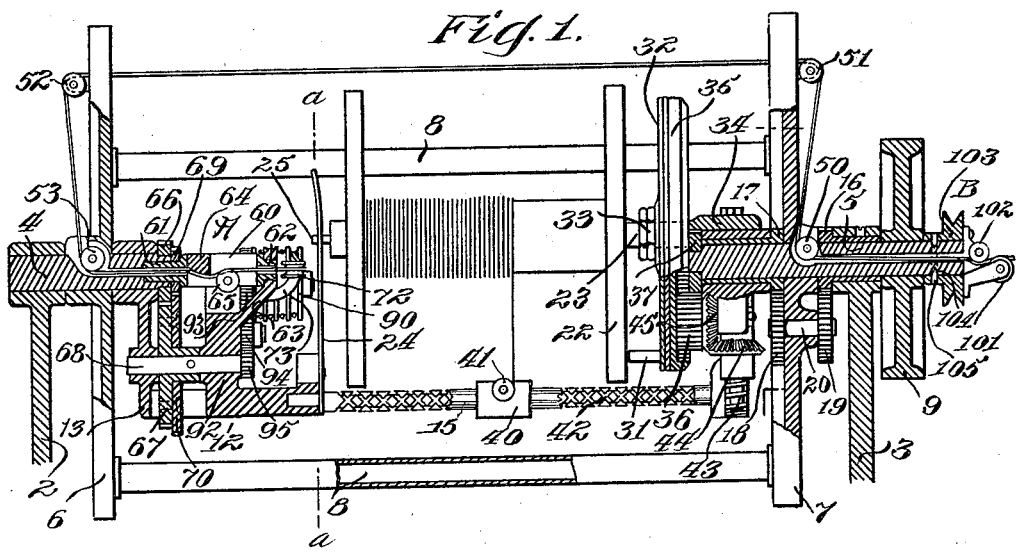
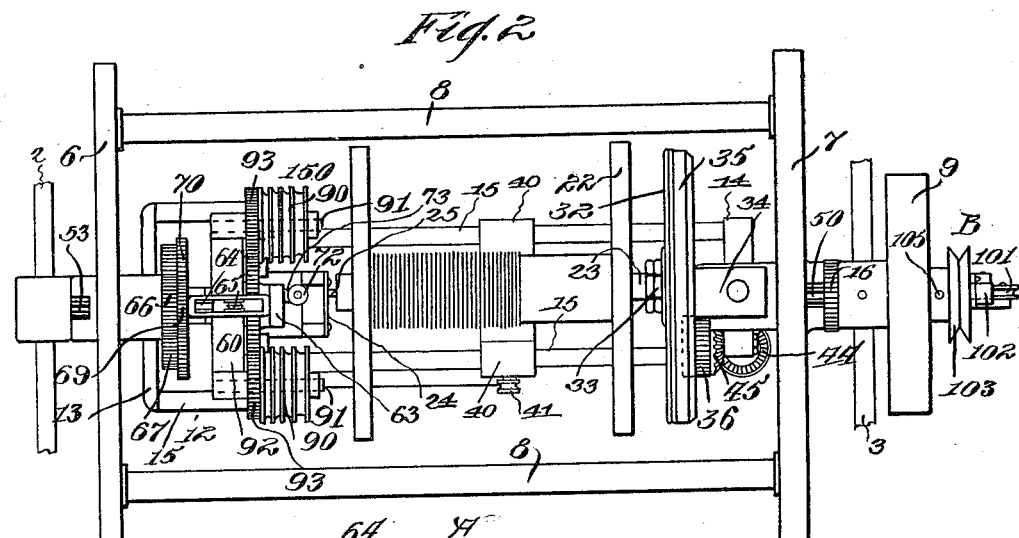
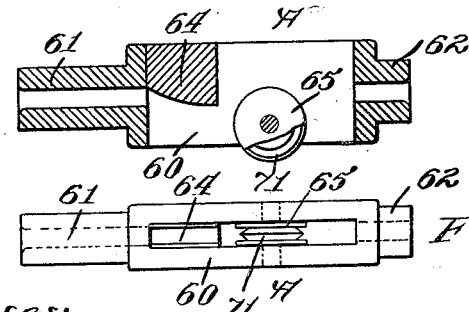
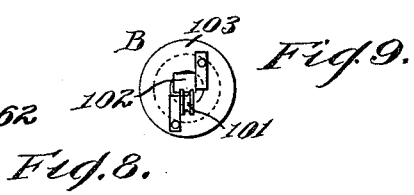
Witnesses:
John H. Lynch.
C. C. Fuss.
Inventor:
Richard Delaney
By his attorney,
F. H. Richards.
COLUMBIA PLANOGRAPH CO., WASHINGTON, D. C.

R. DELANEY.
ROPE AND TWINE MAKING MACHINE.
APPLICATION FILED MAY 9, 1905.

1,031,695.

Patented July 9, 1912.
2 SHEETS—SHEET 2.

Witnesses:
John N. Lynch.
C. C. Fuss.

Inventor:
Richard Delaney
By his attorney,
F. H. Richards.

UNITED STATES PATENT OFFICE.

RICHARD DELANEY, OF BOSTON, MASSACHUSETTS.

ROPE AND TWINE MAKING MACHINE.

1,031,695.  Specification of Letters Patent.  Patented July 9, 1912.

Application filed May 9, 1905. Serial No. 259,592.

*To all whom it may concern:*

Be it known that I, RICHARD DELANEY, a citizen of the United States, residing in Boston, in the county of Suffolk and State of Massachusetts, have invented certain new and useful Improvements in Rope and Twine Making Machines, of which the following is a specification.

This invention relates to rope and twine-making machines, and more particularly to that part thereof known as the main flier or take-up mechanism, an object of the invention being to provide an improved mechanism of this character which will produce a smooth, clean, strong twine.

A further object of the invention is the provision of means which will twist the sliver into twine at a time when it is no longer subjected to centrifugal force or the air to roughen it, and therefore just prior to its being wound on the spool and after it has been carried around by the main flier, thereby to provide a comparatively smooth, clean twine.

A further object of the invention is the provision of an improved mechanism carried within the main flier for practically unmaking and remaking the twine after it passes from the main flier.

A further object is the provision of means in connection with the twine remaking mechanism for assisting the pulling forward of the sliver by the main flier.

Figure 3:
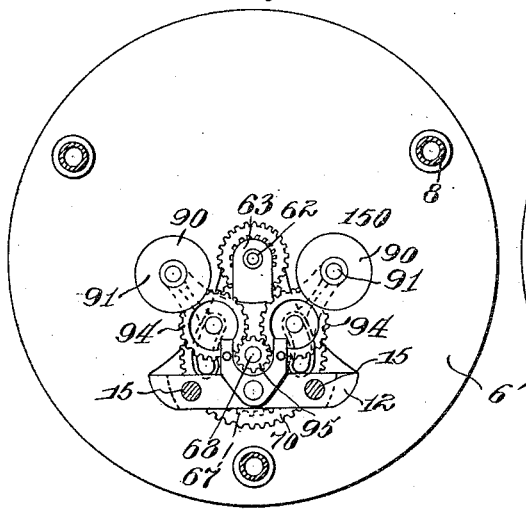
Figure 4:
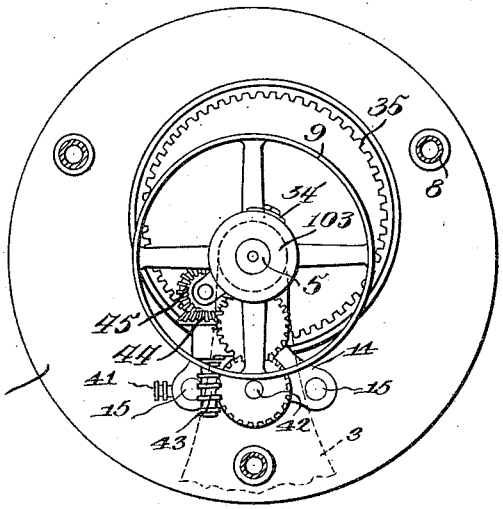
Figure 5:
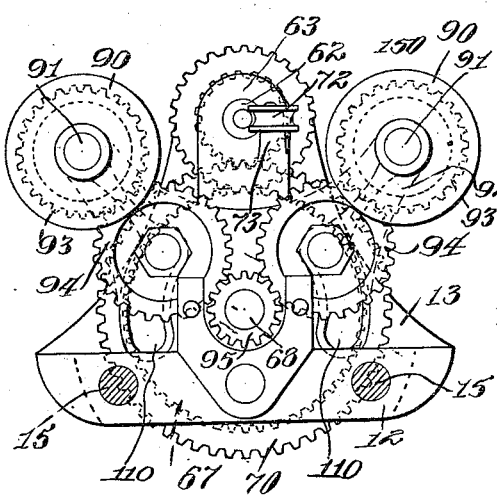
Figure 6:
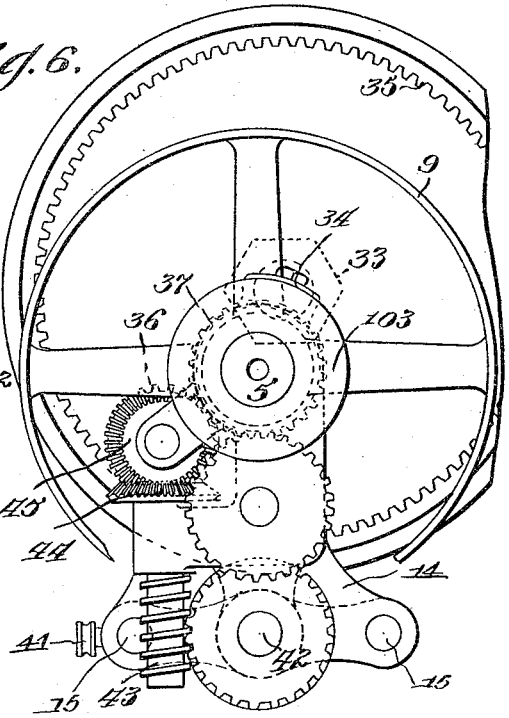

In the drawings accompanying and forming part of this specification, Figure 1 is a longitudinal sectional view of one form of this rope and twine machine. Fig. 2 is a top or plan view thereof. Fig. 3 is a view taken in line *a—a* Fig. 1, looking toward the left hand. Fig. 4 is an end view, also looking toward the left, but with the flier head at the right-hand end removed. Fig. 5 is an enlarged view of a portion of the mechanism shown in Fig. 3. Fig. 6 is an enlarged view of the mechanism shown in Fig. 4. Fig. 7 is an enlarged sectional view of the auxiliary flier 1. Fig. 8 is an underside view thereof; and Fig. 9 is an end view of the primary whirl shown at the right hand end of the main flier.

Similar characters of reference indicate corresponding parts in the different figures of the drawings.

It has been found by practical experience that it is extremely difficult, if not impossible, to obtain a smooth, clean twine when the twine is first twisted and then carried around with the main flier in such twisted condition, as during the harsh treatment of whirling the twisted product through the air with the main flier, it is subjected to centrifugal force and to the action of the air, both of which materially roughen it. No satisfactory mode of avoiding this has so far as I am aware been discovered, in consequence of which the twine is not as smooth and clean as it should be. To avoid this serious disadvantage is one of the objects of the present invention, the mechanism being so organized that, after the twine has passed into that position where it is no longer carried or whirled around by the main flier, it is first transformed into its original normal condition of sliver, and then practically remade into twine, and this at a time when there is no longer any danger of its being roughened or subjected to harsh treatment, so that not only a much cleaner and smoother twine is obtained, but a stronger twine produced.

The sliver as it passes from the combing machine and nippers (not shown) in the present improved machine, passes through what I have termed a primary whirl designated in a general way by B, which comprises a pair of rolls or sheaves 101 and 102 suitably connected to a pulley 103 mounted for independent rotation on one end of one of the flier-shafts, as 5. To this pulley motion is imparted to rotate it, in the organization shown, in the same direction as, but at a greater speed than the speed of the main flier, the best result being obtained by giving this primary whirl twice the speed of the main flier. In the form shown the flier-shaft is provided with a groove 104, into which pins 105 carried by the hub of the pulley project, which thus prevent separation of the primary whirl from the flier-shaft but permit independent rotation of such primary whirl relatively to the shaft. By this mechanism the turn or twist in the sliver as it comes from the combing machine is driven sufficiently far back into the ordinary nipper (not shown) that the fibers are properly caught and pulled forward with more certainty than would be the case if only the ordinary half-turn or twist were put in by the main flier; that is to say, this improved mechanism, by putting twist into the yarn in excess of the normal twist, as put in by the main flier itself, results in the twist being driven hard into the nipper, so that the yarn or sliver is not so liable to come apart and cause the stopping of the machine. This excess twist or turn, however, comes out of the sliver or yarn as soon as it passes the rolls of the primary whirl, such sliver passing around the main flier with the normal half-turn put into it by the revolution of the flier.

Journaled in standards 2 and 3 of the frame-work, which may be of any suitable design and structure, is a pair of tubular shafts 4 and 5 respectively carrying flier-heads 6 and 7, connected by suitable members, preferably in the form of tubes 8, and which heads and tubes constitute the main flier of the take-up mechanism. To this main flier motion is imparted in the present instance, by a belt, and for this purpose a pulley 9 is provided, mounted upon one of the flier-shafts, as for instance the shaft 5. Depending within the main flier and extending longitudinally thereof, is a cradle 12, of any suitable construction adapted for the purpose. In the form shown it comprises a pair of depending segmentally shaped arms 13 and 14, connected by rods or bars 15. The arm 13 is mounted on the flier shaft 4, while the arm 14 is mounted on the flier shaft 5. To maintain this cradle stationary, suitable means are provided, shown as planet gearing, one member 16 of which is fixed to the frame-work and another member 17 fixed to the hub of the cradle, such members being of the same size and respectively in mesh with pinions 19 and 18 fast upon a shaft 20 journaled in the end of the main flier. By this organization rotary movement of the main flier is not imparted to the cradle, although it is suspended directly from the shafts of said main flier.

Located within the main flier is a spool 22, carried by spindle 23, one end of which is maintained in position by a suitable spring-arm 24, having an opening engaging a pin 25 of said spindle and which arm is carried by the cradle. The opposite end of the spool is connected with a suitable friction disk to impart rotary movement to the spool. A suitable dog 31, usually several, carried by one of the friction disks 32 is intended to engage the end of the spool. The friction disks are clamped in operative relation by suitable nuts 33. These friction disks are mounted upon the end of a bracket 34 fixed to the cradle within the main flier, and one, as 35, is formed as an internal gear, to which motion is imparted by means of a gear 36 in mesh therewith and in mesh with a pinion 37 fixed to the inner end of the flier-shaft 5. The friction disks permit the speed of the spool to decrease as the diameter of the wound spool increases.

For laying up the twine upon the spool, suitable means are provided comprising in the present instance a carriage 40 reciprocally mounted upon the bars 15 of the cradle, which carriage may carry at one side a suitable finger (not shown), or have merely a guide roll 41 for guiding the twine to the spool. For imparting reciprocating movement to this carriage a reverse screw-shaft 42 is mounted on the cradle. To this shaft motion is imparted by means of a short depending worm 43 carrying a bevel gear 44 in mesh with a bevel gear 45 formed on or as a part of the spur gear 36 meshing with the friction disk internal gear. The sliver passes to the main flier through the tubular shaft 5, where it receives its first twist or half-turn, prior to which it will receive an excess twist for the purpose set forth, which, as hereinbefore stated, however, passes out of the sliver as it leaves the primary whirl. As it passes from the tubular shaft 5 it is guided by a suitable guide-roll 50 located in an opening of the hub of the main flier, and from thence it passes to a similar guide-roll 51 carried adjacent to the periphery of the main flier. From this guide-roll it passes to the opposite end of the main flier to a similar guide-roll 52 located upon the other head of the main flier and from thence to another guide-roll 53 mounted in an opening in the flier-hub.

The mechanism so far described, excepting the primary whirl previously set forth herein, is a mechanism to which I do not make any claim *per se*.

Heretofore, in flier mechanisms such as that just described, after the twine has passed its last guide-roll it has received its second or double twist, but, as will be obvious, it has been whirled through the air with the main flier and subjected to centrifugal force and to the air, which have a constant tendency to roughen the twisted sliver so that it is not as smooth and clean as it should be. For the purpose of preventing this I have provided improved mechanism which removes the twist first placed in the sliver by the main flier as it passes to the auxiliary flier, and also prevents the final twist being put into the sliver. This mechanism comprises, in the form shown, although it is to be understood various means which might accomplish the purpose set forth can be used, and located otherwise than as shown herein if desired, what I have termed a whirl; and for the purpose of distinguishing it from the primary whirl previously described I will term it herein the auxiliary flier. It is shown supported at the rear end of the cradle and on the hanger thereof, and is designed to turn in the same direction as the main flier but at a greater speed, usually at twice the speed of the main flier. By means of this auxiliary flier the fibers of the sliver are brought parallel and again twisted. This improved auxiliary flier, designated in a general way by A, comprises in the form shown a rotatable skeleton supporting member 60 having tubular ends 61 and 62, one journaled in the main flier-shaft 4, through which the twine passes from the last guide-roll, and the other journaled in an arm or bracket 63 of the cradle. This supporting member 60 carries suitable guide-devices adapted to give a sinuous form to the sliver as it passes therethrough. In the form shown, these devices comprise a fixed and grooved member 64 and a sheave 65 so located, for instance one above but in front of the other, that a sinuous form or bend is given to the sliver as it passes through the auxiliary flier. For imparting motion to this auxiliary flier, suitable gearing may be provided, one gear 66 fixedly secured to the tubular flier-shaft 4 and in mesh with a gear 67 carried by a shaft 68 mounted in the cradle-hanger and to which gear 67 is fixed a gear 70 in mesh with a gear 69 fixed to the end of the supporting member 61 of the auxiliary flier. In practice the gear 66 may be provided with twenty-four teeth, while the gear 67 may have thirty-six, the gear 69 fifteen and the gear 70 forty-five, thus giving the required speed to the auxiliary flier. The sheave 65 is of peculiar formation, it being what might be termed a split or bladed sheave; that is to say, it is provided with a circumferential dividing portion, blade or member 71 midway between its ends, thereby to divide or separate the sliver as it passes thereto and thereover. From this auxiliary flier the twine, properly twisted, passes to a pull-down mechanism 150, which may be of any suitable construction, a suitable guide-roll 72 being carried by an arm 73 of the cradle to guide the twine after it passes the auxiliary flier to the capstans of the pull-down. By means of this improved auxiliary flier, the first turn of the double twist which is put into the sliver as it passes to the main flier through its tubular shaft 5 is taken out of the sliver and the second twist, which would ordinarily be put into the sliver as it passes from the last guide-roll 53, is prevented. In other words, the auxiliary flier moving at a speed twice as fast as the flier removes the twist put into the sliver in the first instance and prevents the final twist being put into the sliver, and thus places the twine in its original condition of sliver and without practically any twist as it passes from the flier proper, such sliver getting both its turns or its full twist immediately in front of and as it passes from the divided sheave 65. Thus, the twine is practically remade after it has passed from the flier, and at a point where it will not be roughened by contact with the air or by centrifugal force. By means of the bladed or split sheave the sliver is divided and then, as it leaves such sheave and is twisted there is a tendency to twist each division or turn of the separated strands independently, and as this mode of operation winds in the ends of the fiber, and as there is no means tending to throw them out subsequently, a cleaner, smoother, as well as a stronger twine is obtained. The formation of the auxiliary flier so that a sinuous bend or turn is given the sliver permits the twist to be taken out of the sliver without the necessity of exerting any pressure on the top of the sliver, which would otherwise be necessary.

From the foregoing it will be seen that the sliver or yarn comes through the auxiliary flier without any twist in it, receiving in front of its last point of contact, to wit, in this case in front of the bladed sheave, its full turn or two twists, while there is also a tendency to twist independently each of the divided portions before or as this full turn is put in, so that the twine is practically remade after it has entered and passed from the flier, and consequently is not subjected to the harsh treatment of being whirled through the air with the flier after it has been twisted, so that, as hereinafter stated, a comparatively smooth, clean, as well as a stronger twine is obtained, whereas in an ordinary double twist machine the twine passes to and over the flier with a turn or twist in it, and owing to the action of the air and centrifugal force the yarn or sliver gets very much roughened and the addition of the final twist at the rear end of the flier does not tend to increase its smoothness.

As the sliver is remade into twine it passes, as hereinbefore stated, to the pull-down mechanism, which in the present instance comprises suitable capstans and gearing for imparting movement thereto. The grooved rolls or capstans 90 are mounted on suitable spindles 91 carried by a bracket 92, shown as a part of the cradle, and motion is imparted by means of a pair of gears 93, one secured to each pull-down roll for rotating the same, and intermediate gearing comprising a pair of gears 94 receiving motion from a pinion 95 carried by the shaft 68, on which two of the gears are mounted for imparting movement to the auxiliary flier. By locating the capstans in the manner shown, that is, with their axes in a plane parallel with the axis of the spool or of the flier, rather than transversely thereto, the rolls can be placed somewhat farther apart, and thus avoid the necessity of the twine cutting across the edges, as may be the case when the rolls are close together, while it also gives a somewhat better balance to the cradle than is given when the rolls are located more toward one side of such cradle. The twine is pulled through the auxiliary flier by means of this pull-down, which of course is suitably laced by such twine, and from this it passes to the laying on device and spool. This bracket 92 carrying the gears 94 is provided with segmental slots 110 which permit the adjustment of the gears 94 toward and from the gears 90, and thus enable larger gears 90 to be used if desired.

The pull down mechanism shown and described is not claimed herein, since it is not a part of my invention except in combination with my twine remaking mechanism.

The term twine or sliver as used herein and in the claims is intended to include any product in connection with which the mechanism shown and described could be used.

Having thus described my invention, I claim:

1. The combination with a flier, of means for removing the twist imparted to the sliver by the flier and then giving two twists to the sliver, and means for pulling the fully twisted product through the re-twisting means.

2. The combination with a flier for imparting a twist to the sliver, of means located interiorly thereof for taking out any twist imparted to the sliver by the flier, and for preventing further twist being put into the sliver by the flier and for then twisting such sliver.

3. The combination with a flier, of means for removing the twist imparted to the sliver by the flier, means rotating faster than the flier for re-twisting the sliver, and means for pulling the twisted product through the re-twisting means.

4. The combination with a flier, of means for removing the twist imparted to the sliver by the flier, means rotating at twice the speed of the flier for re-twisting the sliver, and means for pulling the product through the re-twisting means.

5. The combination with a flier, of means located within the flier for placing the twine in substantially the same condition it was in before it passed as sliver to the flier, and for then twisting such sliver into twine.

6. The combination with a flier and cooperative mechanism organized to give a plurality of twists to the sliver, of means located within the flier for placing the twine in substantially the same condition it was in before it passed as sliver to the flier, and for then imparting a plurality of twists to such sliver; and means for rotating such means at twice the speed of the flier.

7. The combination with a flier and cooperating mechanism organized to give a twist to the sliver as it enters the flier, of means located within the flier for removing the first twist and for preventing a second twist being put into such sliver as it leaves the flier, and to then give the sliver after it leaves the flier, its full twist.

8. The combination with a flier and with a cradle located therein, said mechanism organized to twist the sliver as it enters the flier, of means located within the flier and supported by the flier-spindle for taking out such twist and for preventing a second twist being put into such sliver as it leaves the flier, and for then imparting two twists to the sliver prior to the spooling thereof.

9. The combination with a main flier mechanism organized to give the sliver a twist as it enters the flier, of means located within the flier for removing such twist and preventing a second twist being put into such sliver as it leaves the flier, and comprising an auxiliary flier rotating at a speed greater than the speed of the main flier.

10. The combination with a main flier mechanism organized to give the sliver a twist as it enters the flier, of means located within the flier for removing such twist and preventing a second twist being put into such sliver as it leaves the flier, and comprising an auxiliary flier rotating at a speed greater than the speed of the main flier, said auxiliary flier comprising means for giving a sinuous bend to the twine as it passes therethrough, and gearing for rotating said means.

11. The combination with a main flier mechanism organized to give the sliver a twist as it enters the flier, of means located within the flier for removing such twist and preventing a second twist being put into such sliver at it leaves the flier, and comprising an auxiliary flier rotating at a speed greater than the speed of the main flier, said auxiliary flier comprising a rotary member having a centrally located dividing portion or blade, and means for rotating the same.

12. The combination with a main flier mechanism organized to give the sliver a twist as it enters the flier, of means located within the main flier for removing such twist and preventing a second twist being put into such sliver as it leaves the flier, and comprising an auxiliary flier rotating at a speed greater than the speed of the main flier, said auxiliary flier comprising a rotary member having a sheave provided with a centrally located dividing portion or blade, and means for rotating the same.

13. The combination with a main flier mechanism organized to give the sliver a twist as it enters the flier, of means located within the main flier for removing such twist and preventing a second twist being put into such sliver as it passes from the flier, and comprising an auxiliary flier rotating at a greater speed than the speed of the main flier, said auxiliary flier comprising a rotary member having guiding device and a bladed sheave or member, and means for rotating the same.

14. The combination with a main flier mechanism organized to give the sliver a twist as it enters the flier, of means located within the flier for removing such twist and preventing a second twist being put into such sliver as it leaves the flier, and comprising an auxiliary flier rotating at a speed greater than the speed of the main flier, said auxiliary flier comprising a rotary member having a grooved guiding device and a bladed sheave, and means for rotating the same.

15. The combination with a main flier mechanism organized to give the sliver a twist as it enters the flier, of means located within the flier for removing such twist and preventing a second twist being put into such sliver as it leaves the flier, and comprising an auxiliary flier rotating at a speed greater than the speed of the main flier, said auxiliary flier comprising a rotatable member carrying a pair of members located one diagonally opposite to the other for giving a sinuous bend to the sliver as it passes therebetween, and means for rotating the same.

16. The combination with a main flier mechanism organized to give the sliver a twist as it enters the flier, of means located within the flier for removing such twist and preventing a second twist being put into such sliver as it leaves the flier, and comprising an auxiliary flier rotating at a speed greater than the speed of the main flier, said auxiliary flier comprising a rotary member having one end supported by the flier-shaft and provided with a pair of devices located in opposition and constructed to give a sinuous bend to the sliver as it passes through the same, and gearing for rotating the same.

17. The combination with a main flier and its shaft, of a stationary cradle located therein, an auxiliary flier rotatable in the same direction but at a speed greater than the speed of the main flier, one end thereof supported by the flier-shaft and the other end thereof by the cradle, and gearing for imparting movement from the main flier to the auxiliary flier but organized to rotate said auxiliary-flier at a greater speed than the speed of the main flier.

18. The combination with a main flier and its shaft, of a stationary cradle located therein, an auxiliary-flier rotatable in the same direction but at a speed greater than the speed of the main flier, one end thereof supported by the flier-shaft and the other end thereof by the cradle, and gearing for imparting movement from the main flier to the auxiliary-flier but organized to rotate said auxiliary-flier at a greater speed than the speed of the main flier, said auxiliary-flier having a fixed grooved device and a bladed sheave so located relatively to each other as to impart a sinuous bend to the sliver as it passes through the auxiliary flier and to divide the sliver into separate portions.

19. The combination with a main flier mechanism, of an auxiliary flier carried by the same and constructed and arranged to impart a sinuous bend to the sliver as it passes therethrough, the auxiliary flier having means constructed and arranged to take out of the sliver any twist placed therein by the main flier, the auxiliary flier also having means constructed and arranged to divide such sliver into separate portions and to thereupon fully twist such separated portions, and means for causing operation of the auxiliary flier.

20. The combination with a main flier mechanism, of an auxiliary flier carried by the same and constructed and arranged to impart a sinuous bend to the sliver as it passes therethrough, the auxiliary flier having means constructed and arranged to take out of the sliver any twist placed therein by the main flier, the auxiliary flier also having means constructed and arranged to divide such sliver into separate portions and to thereupon fully twist such separated portions, means for causing operation of the auxiliary flier, and means for pulling the sliver through the auxiliary flier.

21. The combination with a main flier mechanism, of an auxiliary flier carried by the same and constructed and arranged to impart a sinuous bend to the sliver as it passes therethrough, the auxiliary flier having means constructed and arranged to take out of the sliver any twist placed therein by the main flier, the auxiliary flier also having means constructed and arranged to divide such sliver into separate portions and to thereupon fully twist such separated portions and to then twist the separated portions together, and means for causing operation of the auxiliary flier.

22. The combination with flier mechanism, of an auxiliary flier carried by the same and constructed and arranged to impart a sinuous bend to the sliver as it passes therethrough, the auxiliary flier having means constructed and arranged to take out of the sliver any twist placed therein by the main flier, the auxiliary flier also having means constructed and arranged to divide such sliver into separate portions and to thereupon fully twist such separated portions and to then twist the separated portions together, means for causing operation of the auxiliary flier, and a pull-down mechanism for pulling the twine through the auxiliary flier.

23. The combination with flier mechanism organized to give two twists to the sliver, of means located adjacent to the point of entrance of the sliver to the flier for imparting an excess twist to the sliver prior to the entrance of the sliver to the flier, and means located within the flier for taking out all of the twist imparted thereto by the flier and for then fully twisting such sliver.

24. The combination with mechanism organized to give two twists to the sliver, of means located adjacent to the point of entrance of the sliver to the flier for imparting an excess twist to the sliver prior to the entrance of the sliver to the flier, means located within the flier for taking out all of the twist imparted thereto by the flier and for then fully twisting such sliver, and pull down mechanism for pulling the sliver through said last means.

25. The combination with a rotary main flier mechanism, of a rotary whirl located adjacent to the point of entrance of the sliver to the main flier and rotated in the same direction as the main flier but at a greater speed than the main flier for imparting to the sliver an excess twist, and a rotary auxiliary flier located within the main flier for taking out any twist imparted thereto prior to the sliver reaching such auxiliary flier and for then fully twisting said sliver.

26. The combination with a rotary main flier mechanism, of a rotary primary whirl located adjacent to the point of entrance of the sliver to the main flier and rotated in the same direction as the flier but at a greater speed than said main flier for imparting to the sliver an excess twist, an auxiliary rotary flier located within the main flier for taking out any twist imparted thereto prior to the sliver reaching such auxiliary flier and for then fully twisting said sliver, and means for pulling the sliver through the auxiliary flier.

27. The combination with a main flier mechanism, of a rotary primary whirl located adjacent to the point of the entrance of the sliver to the main flier and rotatable in the same direction but at a speed greater than that of the main flier for giving an excess twist to the sliver prior to its entrance into the main flier, a rotary auxiliary flier located within the main flier, and means for operating said auxiliary flier to take out any twist given to the sliver prior to its entrance into the auxiliary flier and to divide the sliver, and then fully twist such divided portions together, the tendency being to also twist such divided portions independently.

28. The combination with a main flier mechanism, of a primary rotary whirl located adjacent to the point of entrance of the sliver to the main flier and rotatable in the same direction but at a speed greater than of the main flier for giving an excess twist to the sliver prior to its entrance into the flier, an auxiliary flier located within the flier and organized to take out any twist given to the sliver prior to its entrance into the auxiliary flier and to divide the twine and then fully twist such divided portions together, the tendency being to also twist such divided portions independently, and pull-down mechanism for pulling the sliver through the auxiliary flier.

29. The combination with a flier mechanism, of a stationary cradle located therein, and means carried by said cradle and flier and rotatable in the same direction as the flier but at a greater speed than the speed of such flier for removing any twist imparted to the sliver by the flier, and for then fully twisting such sliver.

30. The combination with a flier mechanism, of a stationary cradle located therein, means carried by said cradle and flier and rotatable in the same direction as the flier for removing any twist imparted to the sliver by the flier and for then fully twisting such sliver, and gearing for imparting to such means a speed twice that of the flier.

31. The combination with a flier mechanism, of a stationary cradle located therein, means carried by said cradle and flier and rotatable in the same direction as the flier for removing any twist imparted to the sliver by the flier and for then fully twisting such sliver, gearing for imparting to such means a speed twice that of the flier, and pull-down mechanism for pulling the sliver through such means, such pull-down mechanism receiving movement from the flier through the gearing which imparts movement to the rotary means.

32. The combination with a flier mechanism constructed to impart a twist to the sliver to form twine, of means located within the flier for unmaking the twine and then remaking it.

33. The combination with a flier mechanism constructed to impart a twist to the sliver to form twine, of means located within the flier for unmaking the twine and then remaking it, and pull-down mechanism also located within the flier.

34. The combination with flier mechanism for imparting a twist to the sliver to form twine, of means located within the flier for un-making the twine, dividing it, and then remaking it.

35. The combination with flier mechanism for imparting a twist to the sliver to form twine, of means located within the flier for un-making the twine, dividing it and then re-making it, and pull-down mechanism for pulling the twine from the re-making means.

36. The combination with flier mechanism organized to give a twist to the sliver to form twine, of means located within the flier for unmaking the twine and passing it therethrough in a sinuous bend, dividing the sliver, and then re-making it.

37. The combination with flier mechanism organized to give a twist to the sliver to form twine, of means located within the flier for unmaking the twine and passing it therethrough in a sinuous bend, dividing the sliver, and then re-making it, and pull-down mechanism for pulling the twine from the re-making means.

38. The combination with a rotary flier for twisting sliver to form twine, of means operative to put an extra twist into the sliver prior to the twist given thereto by the flier, and mechanism for taking out the twist given to the product by the flier and then imparting to the product its full twist.

39. The combination with a rotary take-up flier for twisting the sliver to form twine, of a primary whirl located at one end of and exteriorly of said flier and arranged to put an extra twist into the sliver prior to the twist given thereto by the flier, said members being constructed and organized whereby the extra twist imparted to the sliver by the primary whirl is removed after the sliver passes from the whirl.

40. The combination with a main rotary take-up flier, of means for putting into the sliver an extra twist prior to the twist given thereto by the flier, of a primary whirl located adjacent to the point where the sliver enters the main flier and rotating at a speed faster than that of the flier so that the extra twist is removed from the sliver as the sliver leaves the primary whirl.

41. The combination of a flier for imparting a twist to the sliver to form twine and means within the flier for taking out such twist and for re-twisting the sliver.

42. The combination of a flier for imparting a twist to the sliver, and means supported at one end by the flier for taking out such twist and for re-twisting the sliver.

43. The combination with a flier for imparting a twist to the sliver to form twine, of means supported adjacent to that end of the flier from which the twine finally passes for taking out such twist and then giving its full twist to the sliver, and means for rotating such means at a different speed than that of the flier.

44. The combination with a flier for imparting a twist to the sliver, of a stationary cradle located therein, and means carried by the flier and cradle for taking out such twist and then re-twisting the sliver.

45. The combination with a flier for imparting a twist to the sliver, of a stationary cradle located therein, means carried by the flier and cradle for taking out such twist and then re-twisting the sliver, and means for rotating such un-twisting and re-twisting means at a speed twice that of the flier.

46. The combination with a flier for twisting the sliver to form twine, of means for twisting the sliver prior to its entrance to the flier and comprising a whirl rotatable in the same direction but at a speed greater than the speed of the flier so that the extra twist put into the sliver by the whirl is removed after the sliver leaves the whirl.

47. The combination with a flier, of means for imparting extra twist to the sliver prior to its entrance to the flier and comprising a whirl made up of a pair of superimposed sheaves so located as to give a sinuous bend to the sliver as it passes therethrough, and means for rotating the same at such speed with relation to the flier that the extra twist is removed from the sliver as it passes from the whirl.

48. The combination with a flier, of means for imparting an extra twist to the sliver prior to its entrance to the flier and comprising a whirl made up of a pair of superimposed sheaves so located with relation to each other that a sinuous bend is given to the sliver as it passes through such sheaves and carried on the flier shaft, and means for rotating the whirl at a greater speed than said shaft so that the extra twist is removed from the sliver as it passes from the whirl.

RICHARD DELANEY.

Witnesses:
F. MILDRED STEWART,
THOMAS W. NORMAN.

---

Copies of this patent may be obtained for five cents each, by addressing the "Commissioner of Patents, Washington, D. C."